United States Patent Office 3,306,824
Patented Feb. 28, 1967

3,306,824
DIETARY FLUORIDE AND VITAMIN
PREPARATIONS
Perttu V. Laasko and James R. Mellberg, Barrington, Ill., assignors to The Kendall Company, Boston, Mass., a corporation of Massachusetts
No Drawing. Filed Dec. 31, 1963, Ser. No. 334,910
5 Claims. (Cl. 167—81)

This invention relates to dietary fluoride preparations. More particularly this invention relates to liquid fluoride and vitamin preparations.

One of the most widespread human afflictions is dental decay. Teeth are subject to decay from the moment of eruption. Within recent years it became recognized that fluoridation is effective in inhibiting or preventing this pandemic disease. Three approved methods of administering fluoride in the control of this disease are: fluoridation of the public water supply; ingestion of fluoride in the form of tablet or liquid preparations; and application topically to the teeth. Lacking a water supply containing adequate fluoride, the topical application method is a less convenient means of control than the second dietary method. Topical application of fluoride requires thorough and careful applications. It should be performed or at least supervised by a dentist and should be repeated periodically. Thus, topical application lacks the convenience of a self-treatment method such as offered by the non-compulsory second dietary method.

Aside from convenience, the dietary method is preferred because the fluoride is available to the teeth even before eruption. The fluoride program can begin shortly after birth. Indeed, there is authority that a fluoride regimen for the expectant mother during the latter stages of the gestation period is beneficial in providing decay resistant teeth in the child. The physician is in a better position than the dentist to institute a prophylactic program for the control of this disease at a very early time. In accord with this program there has been created a demand for ingestible preparations containing fluoride as a dietary supplement.

Vitamin preparations were immediately suggested as vehicles for the fluoride, particularly liquid vitamin preparations for obvious reasons in the case of prescribing prophylactic programs for infants and children. The addition of a body-assimilable form of fluoride to conventional aqueous containing vitamin preparations in standard glass containers resulted in unstable preparations. Sedimentation occurred shortly after the fluoride addition, oftentimes within a period of 24 hours. Chemical analysis indicated that the sediment was due to a reaction between the glass and fluoride, probably hydrogen fluoride, at the acidic pH normally employed in liquid vitamin preparations for optimum vitamin stability. Sedimentation could be inhibited for adequate shelf life at pH levels of about 5 and above, e.g., pH of about 6.3. Unfortunately, some vitamins, particularly vitamin $B_1$, are less stable at the higher pH. Although not entirely a pharmaceutically elegant product, the demand for a liquid, dietary combined fluoride and vitamin preparation has been met by preparing such products at a pH from 5 to 6.5 with calculated overages of vitamins as a compensating factor to maintain a shelf life of miinmum vitamin concentration. In the meantime substitute packaging materials were sought; this, of course, would not solve the problem but merely would avoid it. This course of action led to other problems, not the least of which is the stability of the substitute materials and the stability of dietary ingredients in contact therewith.

An object of this invention is a dietary fluoride supplement suitable for use in the control of dental caries.

An object of this invention is a dietary fluoride and vitamin preparation suitably stable for packaging in a glass container.

Another object of this invention is a stable, dietary fluoride and vitamin preparation at an acid pH within the pH range normally employed in vitamin mixtures for stability.

A further object of this invention is an aqueous preparation containing dietary fluoride and vitamin components dissolved or dispersed therein at a pH below about 5 and suitably stable for packaging in glass.

Another and further object of this invention is an ingestible aqueous preparation containing dietary fluoride and vitamin ingredients at a pH within the range of about 3.0 to 4.5.

These and other objects will be apparent from the following description. The details with which the invention is hereinafter described are not to be interpreted in a limiting sense, but rather as illustrations of the scope of the invention as defined in the appended claims.

For convenience of description and explanation, the essential components of the compositions of this invention may be viewed as falling into three classes: an aqueous vehicle; supplemental dietary ingredients; and ingredients which shall be designated as stabilizing agents for reasons hereinafter appearing. The aqueous vehicle may consist solely of water or water solutions of sorbitol, sucrose, mannitol and the like. Alternatively, the vehicle may comprise a mixture of water and another liquid. The other liquid may be a solvent for or miscible with water insoluble ingredients of the composition. Examples of other liquids are glycerol, polyethylene glycol, propylene glycol and animal or vegetable oils such as corn, cottonseed, peanut, shark liver and like oils. The mixture may be in the form of an emulsion, for example an oil-in-water type emulsion. Emulsions of this type with one or more of the above oils find use in multiple vitamin preparations containing both water-soluble and oil-soluble vitamins. The aqueous vehicle in the form of an emulsion or dispersion may be prepared with the aid of nonionic surfactants such as fatty acid partial esters of hexitol, polyoxyethylene derivatives thereof and polyoxyethylene ethers of higher alcohols. In general aqueous vehicles commonly employed in the preparation of vitamin compositions may be employed in the compositions of this invention.

The supplementary dietary ingredients comprise a water-soluble fluoride and at least one vitamin including either ascorbic acid or a water-soluble derivative of riboflavin. Other vitamins include niacinamide (nicotinamide) riboflavin, thiamine hydrochloride, pyridoxine hydrochloride and vitamins A, D, E and K and esters thereof. Other vitamins and derivatives thereof may also be employed. Examples of water soluble fluoride compounds suitable for use are sodium and potassium fluorides. Sodium fluoride is the preferred fluoride compound. The concentrations of the supplementary dietary ingredients in the compositions of this invention may be those commonly employed as a normal dietary supplement or those dictated by the condition being treated as by prescription of the attending physician. The quantity of fluoride, for example, may depend upon such factors as the age of the individual and the level of fluoride in the local supply of drinking water.

The third class of essential ingredients comprises at least one water soluble aluminum or zirconium salt and, in addition, a compound selected from the group consisting of alkyl acid N-substituted and alkyl acid and hydroxyalkyl N-substituted alkylene polyamines and water soluble salts thereof. Examples of the metal salts are aluminum chloride, aluminum sulfate, aluminum diacetate, aluminum citrate, zirconium chloride and zirconium sulfate. Examples of the N-substituted polyamines are ethylenediaminetetraacetic acid, N-hydroxyethylethylenediaminetriacetic acid, N,N' - dihydroxyethylethylenediaminediacetic acid, diethylenetriaminepentaacetic acid and water soluble salts thereof. It has been found that both the metal salt and N-substituted polyamine are necessary for stable fluoride and vitamin mixtures containing at least either ascorbic acid or a water-soluble ester of riboflavin. This will be illustrated hereinafter specifically with reference to aluminum chloride and ethylenediaminetetraacetic acid or the disodium salt thereof as representative of these materials.

Aqueous fluoride solutions stable in glass containers at a pH of about 4 were obtained upon the addition of aluminum trichloride to the solutions. No precipitate was observed over prolonged periods of storage. The addition of aluminum chloride to a fluoride and vitamin preparation at a pH of 4.3 comprising an aqueous vehicle, sodium fluoride and riboflavin-5-phosphate resulted, however, in the immediate formation of a riboflavinoid precipitate. No precipitate occurred when unesterified riboflavin was substituted for the riboflavin phosphate ester. It appeared that the solubility of the unesterified riboflavin increased in the presence of the aluminum salt.

Additional investigations initially indicated further limited utility of the aluminum compounds as a means of fluoride stabilization in liquid fluoride and vitamin dietary supplements. The rate of degradation of ascorbic acid increased in the presence of these metal ions in solution. It was subsequently discovered that this deleterious effect of these ions on the rate of decomposition of ascorbic acid could be overcome by the addition of an acid substituted polyamine, such as ethylenediaminetetraacetic acid and sodium salts thereof. Moreover, stable fluoride and multi-vitamins preparations, containing both ascorbic acid and riboflavin esters could be prepared at a pH level generally considered optimum for vitamin stability, namely at a pH of from about 3.0 to 4.5. Data illustrating the effect of the combination of aluminum trichloride and ethylenediaminetetraacetic acid on the decomposition of ascorbic acid in a multi-vitamin preparation at room temperature aging are shown in Table I and at 50° C. aging are shown in Table II. The figures in the aging period columns represent milligrams of ascorbic acid per milliliter of the vitamin and fluoride preparation. The concentration of the fluoride was 0.0263 millimole per 0.6 cc. dose. The pH of the preparation was 4.3. EDTA is a shorthand designation of ethylenediaminetetraacetic acid added to the prepartion as the dihydrate of the disodium salt thereof.

TABLE I

| Moles Al-EDTA per mole F | Aging Period | | | |
| --- | --- | --- | --- | --- |
| | 4 days | 2 weeks | 1 month | 5 months |
| 0-0 | 50.2 | 48.6 | 49.5 | 43.3 |
| 0-1 | | 49.5 | 49.0 | 43.7 |
| 0-2 | 51.8 | 50.3 | 48.1 | 43.3 |
| 1-0 | 51.4 | 49.1 | 47.2 | 40.6 |
| 1-1 | 52.4 | 48.6 | 47.2 | 43.7 |
| 1-2 | | 47.8 | 49.0 | 45.1 |
| 2-0 | 46.2 | 44.8 | 43.7 | 36.6 |
| 2-2 | 52.4 | 50.0 | 48.5 | 44.2 |
| 2-4 | 49.3 | 47.8 | 47.2 | 43.7 |
| 4-0 | 38.3 | 32.9 | 32.3 | 28.3 |
| 4-2 | 45.8 | 41.4 | 40.1 | 36.2 |
| 4-4 | 51.0 | 49.1 | 48.5 | 44.2 |
| 4-8 | 46.6 | 47.8 | 46.8 | 42.4 |

TABLE II

| Moles Al-EDTA per mole F | Aging Period | | | |
| --- | --- | --- | --- | --- |
| | 4 days | 2 weeks | 1 month | 5 months |
| 0-0 | 47.1 | 39.7 | 32.7 | 8.4 |
| 0-1 | | 36.7 | 38.4 | 8.9 |
| 0-2 | 48.4 | 41.9 | 33.2 | 10.2 |
| 1-0 | 44.0 | 35.0 | 22.7 | 4.9 |
| 1-1 | | 40.7 | 31.4 | 9.3 |
| 1-2 | | 42.7 | 32.7 | 10.2 |
| 2-0 | 40.9 | 29.9 | 15.7 | 2.8 |
| 2-2 | | 38.4 | 29.6 | 9.7 |
| 2-4 | 47.1 | 41.9 | 31.4 | 10.2 |
| 4-0 | 33.4 | 25.2 | 12.6 | 4.0 |
| 4-2 | | 33.3 | 20.9 | 4.4 |
| 4-4 | | 42.3 | 31.4 | 9.7 |
| 4-8 | 45.4 | 38.0 | 29.6 | 9.3 |

As shown, the rate of decomposition of ascorbic acid in solutions containing trivalent aluminum ions is reduced by the presence of ethylenediaminetetraacetic acid. The presence of the acid does not interfere with the stabilizing effect of the aluminum ions on the fluoride.

The amount of fluoride in the compositions of this invention determines the amount of metal salt to be added thereto. A possible theoretical explanation of the inhibition of the fluoride-glass reaction is the ability of the metal cations to combine with a plurality of fluoride ions, for example, as many as six fluoride ions in the case of trivalent aluminum. This would suggest a minimum of one mole of aluminum per 6 moles of fluoride. However, turbidity occurred early during aging of the multi-vitamin preparation set forth below when the molar ratio of aluminum cations to fluoride anions was reduced from 1:3 to 1:5. The apparent necessity for an amount in excess of the minimum stoichometric amount of aluminum is not necessarily in conflict with the theoretical considerations proposed above. The reaction may be governed by mass action reaction rates. In the light of this and observations made, it is recommended that the minimum mole ratio of aluminum to fluoride be 1:3. The same considerations are generally applicable in the case of zirconium. Generally, an equimolar amount of fluoride and aluminum or zirconium is preferred. From the standpoint of a pharmaceutically refined product aluminum:fluoride or zirconium:fluoride mole ratios in excess of 2:1 are not preferred since this merely increases the amount of therapeutically inactive ingredients in the product.

The concentration of the anionic acid substituted alkylene polyamine ions is, in turn, determined by the concentration of the metal salt. The multi-vitamin formulation set forth below contains sodium fluoride, aluminum chloride and disodium ethylenediaminetetraacetic acid dihydrate in equimolar amounts. Equimolar amounts of the metal cation and the fluoride and the acid anions are preferred. Formulations containing 0.75 mole of the acid anion per mole of aluminum cation were satisfactorily stable and clear over a prolonged period of aging. At less than about 0.50 mole of the anion per mole of the aluminum cation hazy appearing solutions resulted. Amounts in excess of an equimolar amount of the ethylenediaminetetraacetic acid may be employed, the amount of the excess being limited by such factors as solubility and the desire to maintain therapeutically inactive ingredients in pharmaceutical formulations at a minimum.

The following is a specific example of a liquid fluoride and vitamin formulation containing a plurality of vitamins, including both ascorbic acid and riboflavin-5-phosphate. An appropriate dosage unit for oral administration of the formulation is 0.6 cc. The formulation contains 0.50 mg. of fluoride ion per 0.6 cc. dosage unit.

Ingredients: Parts
Methyl parabenzoic acid _____gm__ 0.95
Propyl parabenzoic acid _____gm__ 0.11
Sodium fluoride _____gm__ 0.995
Niacinamide _____gm__ 9.9

| Ingredients:—Continued | | Parts |
|---|---|---|
| Riboflavin-5-phosphate | gm | 2.32 |
| Ascorbic acid | gm | 81.0 |
| Sodium hydroxide | gm | 8.0 |
| Thiamine hydrochloride | gm | 9.9 |
| Pyroxidene hydrochloride | gm | 1.09 |
| Sodium saccharine | gm | 2.71 |
| Vapad [1] | gm | 3.6 |
| Tween 80 [2] | ml | 40.5 |
| Glycerol | ml | 135 |
| Propylene glycol | ml | 81 |
| EDTA [3] | gm | 8.82 |
| Aluminum trichloride hexahydrate | gm | 5.71 |
| Water, q.s.ad | ml | 540 |

[1] A mixture of vitamin A palmitate and vitamin D₂ commercially available from S. B. Penick Laboratory.
[2] A polyoxyalkylene derivative of sorbitan monooleate.
[3] Disodium ethylenediaminetetraacetic acid dihydrate.

The parabenzoic acids were dissolved in 140 ml. of boiling water and cooled. The next ten listed ingredients were added to the cooled solution. The sodium hydroxide was first dissolved in 20 ml. of water and the Vapad vitamin mixture was dissolved in the Tween 80 nonionic surfactant prior to the addition. The EDTA was dissolved in the glycerol by heating and the propylene glycol and aluminum chloride added thereto. The two solutions were combined with stirring and 2 ml. of flavoring was added. The pH was adjusted to 4.3 by the addition of hydrochloric acid. Additional water was then added to make 540 ml. of the solution. Some solutions prepared in this manner initially appeared hazy. This may be cleared up by means of a filtering aid (e.g., Celite made by Johns-Manville Co.) and filtering. The solutions remain clear in glass containers upon extended periods of shelf-life aging.

Urine specimens were collected over a twenty-four hour period after ingestion of 6 cc. of the above formulation and analyzed for fluoride and for aluminum. The 6 cc. dose of the formulation provides 5 mg. of fluoride ions. Analysis confirmed that the fluoride was absorbed. Analysis for aluminum showed that very little, if any, was absorbed by the body. The analytical results are in accord with the report that although aluminum may retard fluoride absorption, quantitatively the difference is very small; see J. Am. Med. Assoc., 117, 109 (1961). The urine fluoride output data are set forth in Table III. The fluoride output after ingestion of 5 mg. of fluoride ions in the form of an aqueous sodium fluoride solution with no vitamins, aluminum and acid substituted amine is shown in the third column of the table. The data in the control column of the table is the normal fluoride output of the same subjects used in the test.

TABLE III

| Control | Fluoride-Vitamin w./Al and EDTA | Aqueous NaF |
|---|---|---|
| 0.558 mg | 2.184 mg | 3.062 mg. |
| 0.744 mg | 2.930 mg | 2.827 mg. |
| 1.307 mg | 2.309 mg | 2.806 mg. |
| Avg. 0.870 mg | 2.475 mg | 2.898 mg. |
| Percent added fluoride recovered | 32.1 | 40.5. |
| Percent fluoride available | 79.2 | 100. |

Each value represents the average elimination of five subjects. The experiment was repeated three times for each subject. The percentage fluoride recovered was calculated after subtracting the control level. The percentage fluoride available was calculated with reference to the output in the case of the aqueous sodium fluoride solution and on the assumptions that this fluoride is 100% available and that bone retention is the same for all absorbed fluoride.

The invention claimed is:

1. A liquid dietary fluoride and vitamin supplement having a pH of about 3.0 to 4.5 comprising an aqueous vehicle containing dietary amounts of water-soluble fluoride and a vitamin component comprising at least one vitamin selected from the group consisting of ascorbic acid and a riboflavin ester soluble in said vehicle, and containing a salt selected from the group consisting of water-soluble aluminum and zirconium chloride, sulfate, acetate and citrate salts in an amount to provide a mol ratio of salt to fluoride of from about 0.33 to 2 to thereby provide metal cations of said salts to prevent reaction of fluoride with glass when said supplement is in contact therewith and a compound selected from the group consisting of acetic acid N-substituted and acetic acid and hydroxyethyl N-substituted ethylenediamine and diethylenetriamine and water soluble salts thereof in an amount to provide a mol ratio of said compound to said salt of from about 0.5 to 1 to chelate with said metal ions.

2. A dietary supplement in accordance with claim 1 wherein said salt is aluminum trichloride and the mole ratio of said compound to said salt is from 0.75 to 1.

3. A dietary supplement in accordance with claim 1 containing equimolar amounts of said fluoride, aluminum trichloride and disodium ethylenediaminetetraacetic acid.

4. A dietary supplement in accordance with claim 1 wherein said salt is aluminum trichloride, said compound is ethylenediaminetetraacetic acid, and the mole ratio thereof to said aluminum is from 0.75 to 1.

5. A dietary supplement in accordance with claim 4 containing equimolar amounts of said fluoride, aluminum trichloride and ethylenediaminetetraacetic acid.

References Cited by the Examiner

Accepted Dental Remedies, 1964, 29th edition, published by American Dental Association, Chicago, 1963, pages 131 and 190.

Dental Abstracts, vol. 5, page 421, July 1960, citing Dibak et al., Ceskoslov. Stomat., 59; 412–417, November-December 1959.

Modern Drugs, September 1962, page 1678.

Muhler et al.: Journal of Dental Research, vol. 54, No. 1, pages 68–72, February 1955.

Sequestrene, published by Geigy Industrial Chemicals, Ardsley, New York, 1952, page 31.

Sisler et al.: College Chemistry, A Systematic Approach, published by the Macmillan Co., N.Y., 1956, page 571.

The Dispensatory of the United States of America, 25th edition, published by J. B. Lippincott Co., Philadelphia, 1955, pages 116–119 and 1192.

Zipkin: Proceedings of the Societies for Experimental Biology and Medicine, vol. 82, pages 80–83, January 1953.

ELBERT L. ROBERTS, *Primary Examiner.*

FRANK CACCIAPAGLIA, JR., *Examiner.*

RICHARD L. HUFF, *Assistant Examiner.*